US012766419B2

(12) United States Patent
Reiter et al.

(10) Patent No.: US 12,766,419 B2
(45) Date of Patent: Oct. 20, 2026

(54) ENCRYPTED ASSET BUNDLES WITH CACHE DEDUPLICATION

(71) Applicant: VRChat Inc., San Francisco, CA (US)

(72) Inventors: Stefan Reiter, Vienna (AT); Aaron McLean, Surrey (CA)

(73) Assignee: VRCHAT INC., San Francisco, CA (US)

( * ) Notice: Subject to any disclaimer, the term of this patent is extended or adjusted under 35 U.S.C. 154(b) by 384 days.

(21) Appl. No.: 18/531,806

(22) Filed: Dec. 7, 2023

(65) Prior Publication Data

US 2025/0186894 A1 Jun. 12, 2025

(51) Int. Cl.
*A63F 13/71* (2014.01)
*A63F 13/63* (2014.01)

(52) U.S. Cl.
CPC .............. *A63F 13/71* (2014.09); *A63F 13/63* (2014.09)

(58) Field of Classification Search
CPC ................................ A63F 13/71; A63F 13/63
See application file for complete search history.

(56) References Cited

U.S. PATENT DOCUMENTS

| | | | | |
|---|---|---|---|---|
| 2014/0156866 A1* | 6/2014 | Kallstrom | G06F 9/45533 | 718/1 |
| 2014/0250066 A1* | 9/2014 | Calkowski | G06F 11/1433 | 707/624 |
| 2017/0366346 A1* | 12/2017 | Newell | H04L 67/02 | |
| 2023/0403318 A1* | 12/2023 | Spitulski | H04L 67/06 | |
| 2024/0082706 A1* | 3/2024 | Astley | A63F 13/352 | |
| 2024/0280787 A1* | 8/2024 | Kwon | G02B 13/0045 | |
| 2024/0350923 A1* | 10/2024 | Ignatchenko | A63F 13/30 | |

* cited by examiner

*Primary Examiner* — Yonas A Bayou
(74) *Attorney, Agent, or Firm* — Polsinelli PC

(57) ABSTRACT

Disclosed are methods, systems, and computer-readable recording media that encrypt user-created game objects and at least partially de-duplicate the objects during future downloads of overlapping content. A first object is downloaded to a user device and stored in cache—and also decompressed, recompressed, encrypted, and bundled into a file with a header at the server. When a second object is downloaded, the server can determine the chunks of the second object that are distinct from the chunks of the first object already stored in the cache, e.g., by using a deterministic identification number associated with a manifest of the file that contains the overlapping chunks. The server can then download the necessary chunks from a file that is not accessible to the user but that includes the chunks requested by the user and accessible to the user. Accordingly, bandwidth and computing resources can be saved.

20 Claims, 5 Drawing Sheets

ENCRYPTED ASSET BUNDLES WITH CACHE DEDUPLICATION

BACKGROUND

Game engines allow users of a gaming system to create unique content that is associated with the user's character. One such example is an avatar for a character within a virtual reality gaming platform ("VR"). Users can develop their avatar as a reflection of the user's personality or preferences. Of course, other content is also downloadable from game engines.

A client device often will download content from a game engine or by downloading and caching Asset Bundles via the application programming interface ("API") of the game engine. An Asset Bundle is a concept used in the context of game development and 3D graphics applications to package and manage digital assets such as textures, 3D models, audio files, and other resources in a more efficient and organized manner. By downloading this content from the API, other platforms have little visibility into the process of downloading and caching of the Asset Bundle—rather, the API itself handles that entire process. The other platforms—for example, the VR gaming platform itself—cannot easily optimize the download or transmission of Asset Bundle data.

The Asset Bundles are often compressed using one of a wide variety of compression algorithms. This compression reduces the download size and disk space, but makes the contents opaque and obfuscates any identical data that need not be downloaded. Put differently, the conventional compression and API system makes deduplication more difficult.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
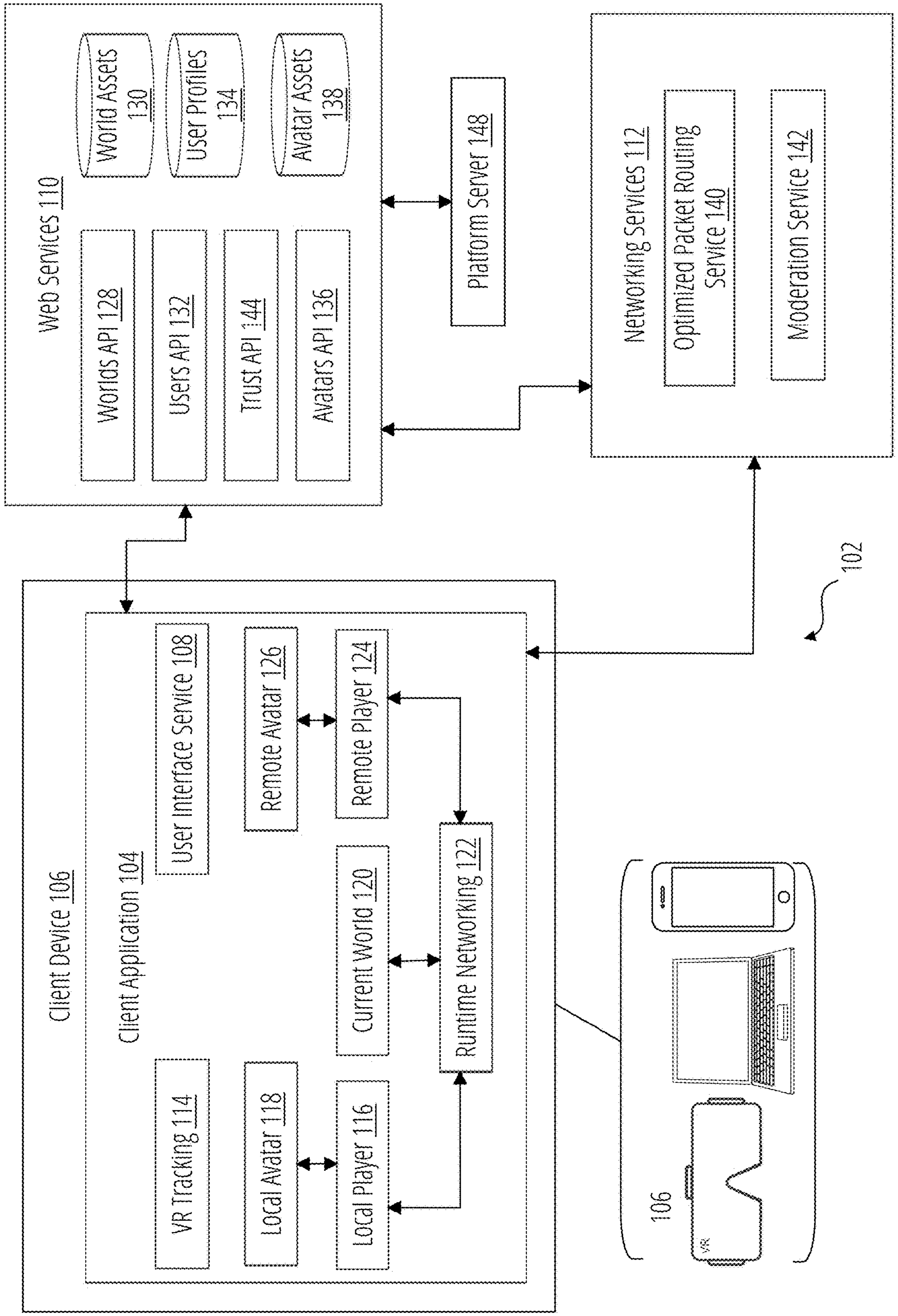
FIG. 1 illustrates an example virtual world platform for playing and hosting a multiplayer virtual reality (VR) experience in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Many game objects reuse portions of assets. For example, some game objects might use shaders, patterns, scripts, etc. from a library of such assets. However, when game objects are distributed, these assets in common are repeatedly distributed such that a client device having two or more game objects stored thereon will redundantly download these assets in common. This paradigm is especially true when a client device or a server already has stored a first version of a game object and later attempts to download a second version of the game object. In such a context, the first version of the game object and the second version of the game object can have more assets in common than those that are different. Yet, because of the way asset bundles are packaged, the entire contents of the game object are downloaded, thus resulting in redundant downloading of significant portions of the game object. The presently disclosed embodiments address the problem of unnecessary downloading of portions of Asset Bundles, for example in a gaming environment. The Asset Bundles were conventionally compressed by a game engine from which the Asset Bundles originated. This prevented the VR gaming environment itself from optimizing the downloading of the bundles.

The present invention also utilizes techniques that protect game objects from copying. Namely, the present technology can encrypt game objects to prevent users of client applications from copying game objects. The encryption of the game objects makes the challenge of determining whether a client device has already downloaded a portion of a game object significantly more challenging because it would require more resources than desired to decrypt game objects in a cache to determine if they are the same as portions of game objects needing to be downloaded. Accordingly, the present technology provides a mechanism that can both protect game objects from theft and can avoid the need to decrypt game objects in order to compare portions of the game object to determine if they are the same.

The presently disclosed embodiments relate to methods, systems, and computer-readable recording media that encrypt user-created game objects and at least partially de-duplicate the objects during future downloads of overlapping content. The embodiments first decompress a first object, divide it into chunks, and then recompress each of the chunks with a common compression algorithm that also has attributes desirable for storing chunks in an asset storage for later download by client applications. The chunks are then encrypted and assembled into a file with a file header, and stored in a user's cache. When a user downloads a similar file (e.g., a later version or a version with overlapping content), the server can determine the chunks of the second object that are distinct from the chunks of the first object already stored in the cache. Thereafter, the client can download only those chunks not already stored in their cache.

The embodiments compress and recompress to establish a common form of compression that the embodiments can then utilize to identify the content within the file. The embodiments further utilize encryption to identify the overlapping and nonoverlapping chunks. For example, the chunks can be identified using a deterministic identification number associated with a manifest of the file that contains the overlapping chunks. In this manner, the embodiments can use the encryption key for one file so as to download the necessary chunks from that file for deduplication purposes, but without providing access to the remaining chunks of the file. The speed of downloading content is improved significantly and securely. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example virtual world platform 102 for playing and hosting a multiplayer virtual reality (VR) experience that is suited to carrying out the present technology. Although the example system depicts particular system components or services and an arrangement of such components and services, this depiction is to facilitate a discussion of the present technology and should not be considered limiting unless specified in the appended claims.

The virtual world platform 102 can connect client applications 104 through web services 110 and networking services 112 to socially interact together in a virtual world hosted by virtual world platform 102.

The virtual world platform 102 primarily includes a client application 104, which is an instance of an application executed on a client device 106. The client application 104 interacts over a network connection with web services 110 which supports client application 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client application 104 also interacts with networking services 112, which provides communication services between client application 104, networking services 112, and a remote instance of client application 104 (not shown) to share state information among respective instances of client application 104. In particular, state information is received from a plurality of instances of client application 104 by networking services 112 as each instance of client application 104 controls its local player 116. Networking services 112 can transfer state information about respective players to other instances of client application 104 when the local players 116 for the respective client instances are all engaged in gameplay in the same virtual world. The networking services 112 provide optimized packet routing through optimized packet routing service 140 and moderation between one or more clients through moderation service 142.

The client application 104 is the runtime environment executing on a particular client device 106. While the present description sometimes refers to client application 104, local client, and remote clients, all are instances of the client application 104 executing on a respective client device 106. One particular user account is logged into a particular instance of client application 104. A local client and remote client are distinguished to illustrate how client application 104 handles first person inputs from a user of the client device 106 upon which client application 104 is executing and handles third party inputs received from another user operating their client device upon which the remote client is executing.

Client device 106 can be any computing device. While client application 104 is particularly adapted to providing an immersive virtual reality experience through interactions that require a VR headset to experience, client application 104 can also be run by computers and mobile devices. Some virtual worlds or complex avatars might not be configured to perform well on certain device types, and therefore, while client application 104 can operate on many platforms and devices, not all virtual worlds or complex avatars will be available or have full functionality on all client devices 106.

User interface service 108 is one service that is part of client application 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client application 104 is permitted to enter. Worlds API 128 can retrieve all public worlds from the world assets database 130 and send a list of those to client application 104. Additionally, worlds API 128 can request world IDs for any private worlds associated with the user account logged into client application 104 and retrieve the private worlds from the world assets database 130 to send to client application 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client application 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client application 104 can download an instance of the virtual world by calling the worlds API 128, which can retrieve the virtual world from worlds world assets database 130 and send it to client application 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client application 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client application 104 can also establish a session with networking services 112 for the specific instance of the world. Networking services 112 can provide information about the current state of the instance of the virtual world. For example, networking services 112 can provide a list of remote avatars 126 present in the virtual world instance to client application 104. In turn, client application 104 can contact the avatars API 136 to download complex avatar assets for the list of remote complex avatars from avatar assets database 138.

If the client application 104 does not have assets for the local avatar 118, client application 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics.

The downloaded instance of the virtual world can be executed by client application 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client application 104.

The VR tracking service 114 pertains to client applications 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client application 104, and the user of client application 104 is authoring the experience. In contrast, the remote player 124 is a playback mechanism representing actions being broadcast to the client application 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client application 104 that are also executing the same virtual world. The current world 120 can transmit and receive state information about the instance of the virtual world. The current world executing on client application 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client application 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client application 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a platform server 148 for validating and compiling user created content prior to storing the compiled content in world assets database 130 or avatar assets database 138.

While the virtual world platform 102 is suited to carrying out the present technology, persons of ordinary skill in the art will appreciate that the present technology can be used in other environments.

Figure 2:
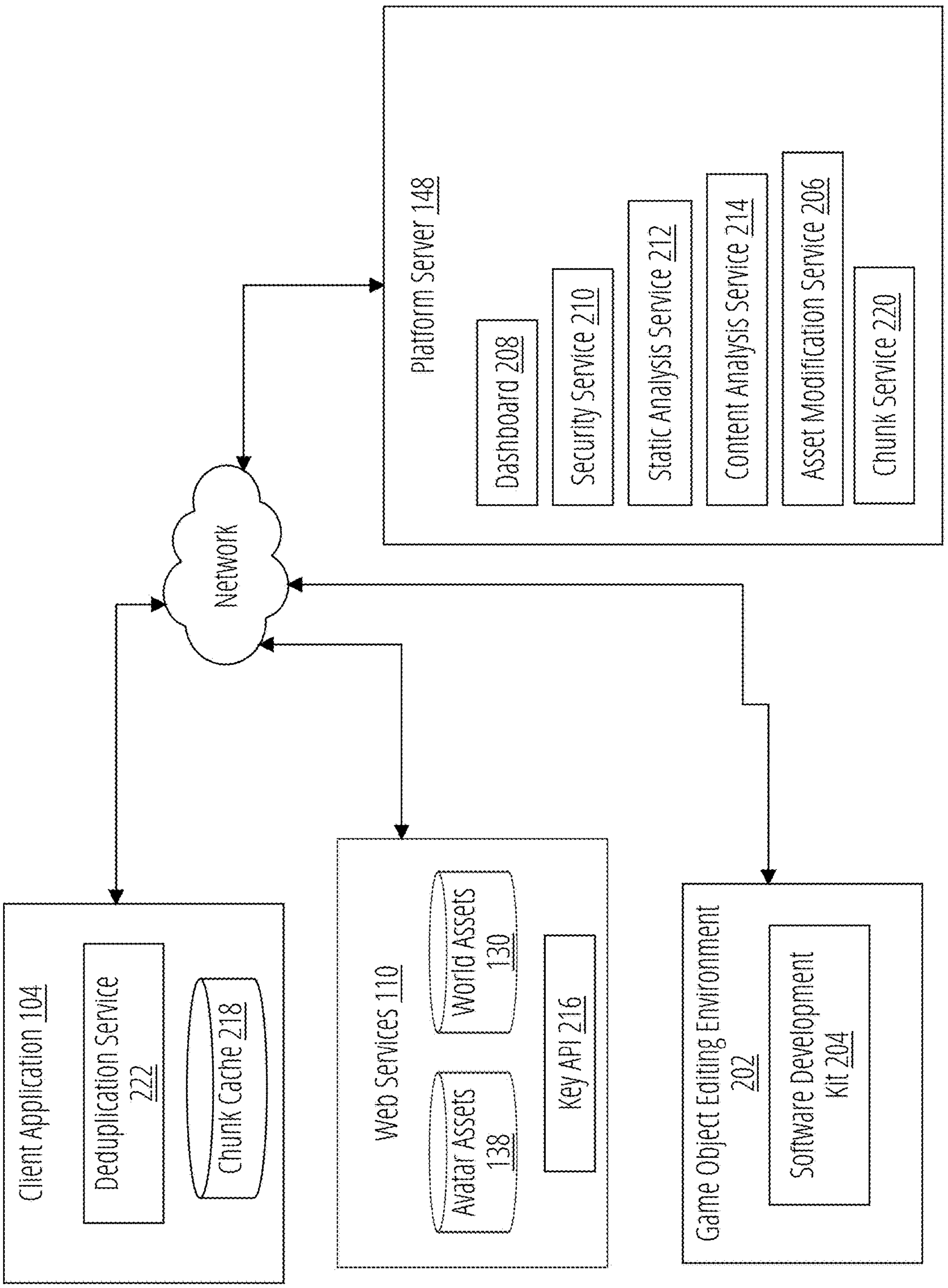
FIG. 2 illustrates an example system for managing user-created game objects to provide a secure and predictable game performance on a client device in accordance with some aspects of the present technology.

FIG. 2 illustrates an example system for permitting user-creation of game objects and the downloading of such objects through a network in accordance with some aspects of the present technology. Although the example system depicts particular system components or services and an arrangement of such components and services, this depiction is to facilitate a discussion of the present technology and should not be considered limiting unless specified in the appended claims.

Users can create user-created game objects using the game object editing environment 202. In some embodiments, the game object editing environment 202 can operate on a client device, which could be client device 106, but as illustrated in FIG. 1 and FIG. 2 client device 106 is provided primarily to illustrate a player's client device 106 running client application 104.

The game object editing environment 202 can be a software development platform for developing software, and especially games, virtual worlds, avatars, etc. Some examples of well-known game object editing environments include UNITY and UNREAL. Game object editing environments 202 can include a software development kit 204 that is provided by the platform server 148. The software development kit 204 can include a variety of assets that are approved for use by users creating user-created game objects as well as tools to aid in the creation of the user-created game objects. Additionally, the software development kit 204 can provide a collection of policies for attributes of acceptable user-created game objects. The software development kit 204 can also include software for performing checks and analysis on the user-created game objects before they are uploaded to platform server 148.

Accordingly, users can create their user-created game objects in the game object editing environment 202 using the functions of the game object editing environment 202 along with the installed software development kit 204. As will be described herein the software development kit 204 includes a variety of functions for performing checks and analysis on the user-created game objects.

Users can compile their user-created game object and upload it to the platform server 148. Generally, users need to compile their user-created game object separately for any distribution platform on which they want the user-created game object to be available.

The platform server 148 can perform a variety of inspections and analyses of the uploaded user-created game objects. For example, the platform server 148 can include a static analysis service 212 that can analyze an asset bundle containing the user-created game object and associated assets. As described herein the static analysis service 212 can analyze the asset bundle to determine whether any assets making up the user-created game object are malformed or prohibited. The static analysis service 212 can also collect statistics regarding the user-created game object that can be used to determine how long the user-created game object might take to download and to determine how efficiently the user-created game object will run.

The platform server 148 can also perform a variety of security services using security service 210. For example, the security service 210 can evaluate the compiled user-created game objects by loading these user-created game objects in a sandboxed environment to ensure that the compiled user-created game objects are safe to run on the supported distribution platforms. The security service 210 can attempt to run or load a user-created game object in a virtual environment that is a simulation of a distribution platform. The security service 210 can collect runtime information to ensure that the user-created game object does not harbor any malicious code.

The platform server 148 can also include a content analysis service 214 that can analyze assets of the user-created game object to identify types of content and flag content that might not be desirable to some players. In some aspects, the content analysis service 214 might also be able to determine when a user-created game object contains an asset that is in violation of a content moderation rule.

In some embodiments, platform server 148 can identify one or more assets of the user-created game objects as needing modifications and can attempt to modify the user-created game object using the asset modification service 206. In one example, an asset might include one or more assets that will perform poorly on some distribution platforms or player devices, and the asset modification service 206 can create a simplified variant of the user-created game object that will perform better on some devices. In another example, the user-created game object might contain content not permitted by the moderation rules, or contain scripts or shaders that are not from a permitted list and can be removed from the user-created game object. In some embodiments, the user-created game object might be compiled for use on a specific distribution platform, and the asset modification service 206 can modify the user-created game object to create variants of the user-created game object that will work on other distribution platforms.

An example of a distribution platform includes different client devices 106 and their operating systems. For example, some common client devices include personal computers, running the STEAM gaming platform, virtual reality headsets, such as the OCULUS family of devices by META, the VISION PRO by APPLE INC., the VIVE family of headsets by HTC, etc., and even mobile devices such as iOS devices by APPLE, and ANDRIOD devices by a variety of manufactures. All of these distribution platforms can be updated over time, and accordingly, the asset modification service 206 can keep the assets of the user-created game objects up-to-date for distribution.

The platform server can also take steps to make the overall environment depicted in FIG. 2 more efficient by packaging the user-created game object in a way that makes it possible for the client applications 104 to avoid downloading unnecessary portions of assets making up the user-created game object. As will be addressed in greater detail herein, the chunk service 220 can break the user-created game object into a collection of chunks that can be compared, even when encrypted, to determine if a copy of that chunk already exists in a particular location. For example, it is not desirable to store multiple copies of the same chunk in either the world assets database 130, avatar assets database 138, or the chunk cache 218.

Once a user-created game object is ready for distribution, platform server 148 can save the compiled user-created game object, such as an avatar or a world in the world assets database 130 or avatar assets database 138 so that the client application 104 can access these assets as described in FIG. 1 above.

The platform server 148 can also include a dashboard 208 that can be used to display information about user-created game objects, and the status of the user-created game objects as reported by platform server 148. For example, the dashboard 208 can be used to inform creators of user-created game objects of security concerns with some assets of a user-created game object, or inform a user of different platforms in which the user-created game object has been compiled, and is ready for distribution on those platforms.

FIG. 2 also illustrates additional details regarding the client application 104. As illustrated in FIG. 2, the client application contains a chunk cache 218. The chunk cache 218 is used to cache user-created game objects such as worlds or avatars for use by the client application. The deduplication service 222 servers the function of avoiding downloading copies of chunks of user-created game objects that already exist in 218.

FIG. 2 also illustrates additional details regarding the web services 110. As illustrated in FIG. 2, the web services 110 includes a Key API 216. The Key API 216 functions to distribute decryption keys to the client application 104 to be used in decrypting user-created game objects.

The components of the system illustrated in FIG. 2 that are related to the chunking and deduplication of chunks of user-created game objects (e.g., Key API 216, chunk service 220, chunk cache 218, and deduplication service 222) will b. addressed in greater detail herein.

Figure 3:
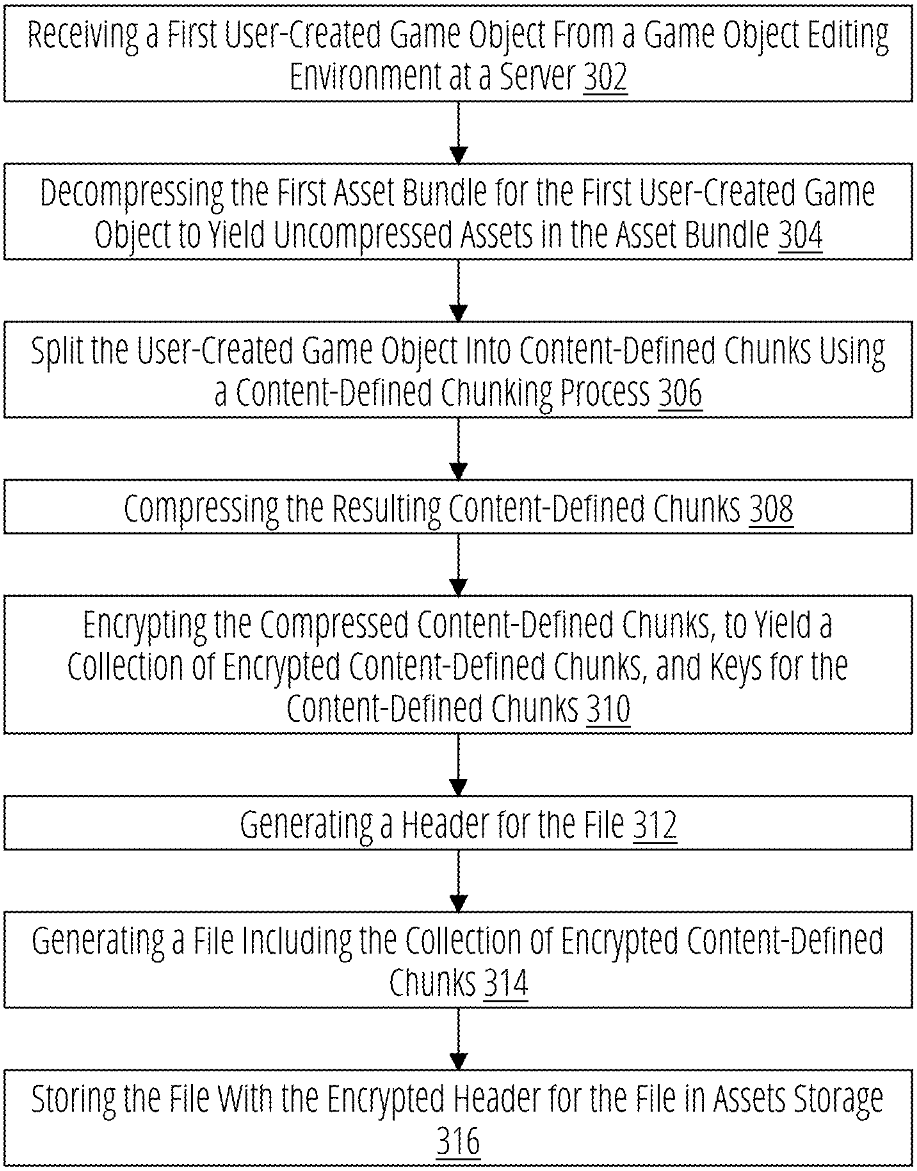
FIG. 3 illustrates an example routine from the perspective of server-side processing flow for chunking user-created game objects in a way that the encrypting user-created game objects can be considered for efficient deduplication accordance with some aspects of the present technology.

FIG. 3 illustrates an example routine for chunking user-created game objects in a way that the encrypting user-created game objects can be considered for efficient deduplication in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As introduced above, many game objects reuse portions of assets. However, when game objects are distributed, these assets in common are repeatedly distributed such that a client device having two or more game objects stored thereon will redundantly download these assets in common. Because of the way asset bundles are packaged, the entire contents of the game object are downloaded, thus resulting in redundant downloading of significant portions of the game object. To address this problem, the present technology can process asset bundles in a way that can identify portions of game objects that might be in common with other already stored game objects to prevent the duplicate downloading or storage of redundant portions of game objects.

According to some examples, the method includes receiving a first user-created game object from a game object editing environment at step 302. For example, the chunk service 220 illustrated in FIG. 2 may receive a first user-created game object from a game object editing environment. As addressed above, the user-created game object can be packaged into a first asset bundle that is compressed. In some embodiments, the first asset bundle is compressed using, for example, LZMA compression (Lempel-Ziv-Markov chain Algorithm (LZMA)). LZMA compression is commonly used to compress user-created game objects by the game object editing environment 202 because it yields smaller file sizes that some other compression techniques. However, this can come at the cost of taking longer to process. Persons of ordinary skill in the art will appreciate that any compression technology could be suitably substituted.

According to some examples, the method includes decompressing the first asset bundle for the first user-created game object to yield uncompressed assets in the asset bundle at step 304. For example, the chunk service 220 illustrated in FIG. 2 may decompress the first asset bundle for the first user-created game object to yield uncompressed assets in the asset bundle.

According to some examples, the method includes splitting the user-created game object into content-defined chunks using a content-defined chunking process at step 306. For example, the chunk service 220 illustrated in FIG. 2 may split the user-created game object into content-defined chunks using a content-defined chunking process. For example, the user-created game object can be divided into variable sized chunks using Fast Content-Defined Chunking ("FastCDC"). Content-Defined Chunking determines the chunk boundaries based on a rolling hash of the data. The algorithm is designed to choose those chunks that are more resilient to "boundary shifts" caused by added or removed data compared to Fixed-Sized Chunking. Using Content-Defined Chunking improves the deduplication rate because added or removed data will only affect chunks near the change, while the rest of the chunks will be unaffected. Thus, the effect of the content-defined chunking is such that portions of the first user-created game object that contain the same data as the second user-created game object are generally divided into resulting content-defined chunks that will include the same data. This feature gives rise to the ability to recognize portions of a user-created game object that are also present in other user-created game objects or other versions of the same user-created game object.

According to some examples, the method includes compressing the resulting content-defined chunks at step 308. For example, the chunk service 220 illustrated in FIG. 2 may compress the resulting content-defined chunks. The compressing can be performed by any compression algorithm, such as, for example, using the LZMA compression algorithm. In addition to the LMZA compression algorithm, other such algorithms that are commonly applied to user-created game objects include the LZ4 compression algorithm or ZSTD (Zstandard). LZMA has the smallest download size but is quite slow to compress or decompress a file, LZ4 can be much larger than LZMA but is about as fast as uncompressed data, and ZSTD is kind of a compromise between the two; it's much faster than LZMA but is somewhat larger.

According to some examples, the method includes encrypting the compressed content-defined chunks to yield a collection of encrypted content-defined chunks, and keys for the content-defined chunks at step 310. For example, the chunk service 220 illustrated in FIG. 2 may encrypt the compressed content-defined chunks to yield a collection of encrypted content-defined chunks and keys for the content-defined chunks.

The content-defined chunks having the same data will also end up having the same key. This is important to be able to quickly compare different chunks. Rather than comparing the contents of the content-defined chunks, it is more efficient to compare a key that is deterministically generated from the content-defined chunks, such as a hash based on the content-defined chunk as an input. In this way, the text of the keys can be compared, which is amenable to efficient comparisons.

The compressed chunks can be encrypted using Convergent Encryption (aka. Message-Locked Encryption). The goal of convergent encryption is to be able to encrypt a given clear text key from multiple independent nodes and guarantee that the encrypted output will match. To accomplish this, the content-defined chunks are encrypted, for example, with AES256-GCM encryption using the hash of its compressed data (plus a secret only the web services 110 will know) and uses a static nonce. This process guarantees that a given compressed content-defined chunk will produce an identical encrypted content-defined chunk every time it is encrypted regardless of what user-created game object it is currently part of.

According to some examples, the method includes generating a header for the asset bundle for user-created game object after it has been broken into the content-defined chunks at step 312. For example, the chunk service 220 illustrated in FIG. 2 may generate a header for the file. The header includes the encryption keys, cache keys, and metadata for the respective chunks in the collection of encrypted content-defined chunks. The cache keys are the keys for the content-defined chunks that identify unique content-defined chunks with a unique key and duplicate content-defined chunks with the same key as described in the paragraphs above. The encryption keys are used to encrypt the content-defined chunks.

The header can be encrypted to protect its contents using an asset-bundle-specific encryption key that can be stored at the web services 110.

The header provides two important functions that allow the present technology to achieve it purposes. First, the encryption keys permit the efficient determination of whether a copy of a given chunk is present in a storage or a cache. Second, since the header identifies all of the chunks that make up an asset bundle for a user-created game object, only a client application that has the asset-bundle-specific encryption key can figure out what chunks are part of the user-created game object, which helps to thwart copying.

According to some examples, the method includes generating a file including the collection of encrypted content-defined chunks at step 314. For example, the chunk service 220 illustrated in FIG. 2 may generate a file including the collection of encrypted content-defined chunks.

According to some examples, the method includes storing the file with the encrypted header and chunks for the file in assets storage at step 316. For example, the chunk service 220 illustrated in FIG. 2 may store the file with the encrypted header for the file in assets storage. An example the assets storage can be the world assets database 130 and/or the avatar assets database 138.

Since the chunks for the file are content-defined chunks, all chunks that have the same data should have the same cache key and have the same encryption. Therefore, the asset storage can use the cache keys to deduplicate its own storage as well. That is, if a particular content-defined chunk (the same chunk of data) is present in multiple different user-created game objects the asset storage need only store that particular content-defined chunk once for all of the different user-created game objects that might utilize it.

Figure 4:
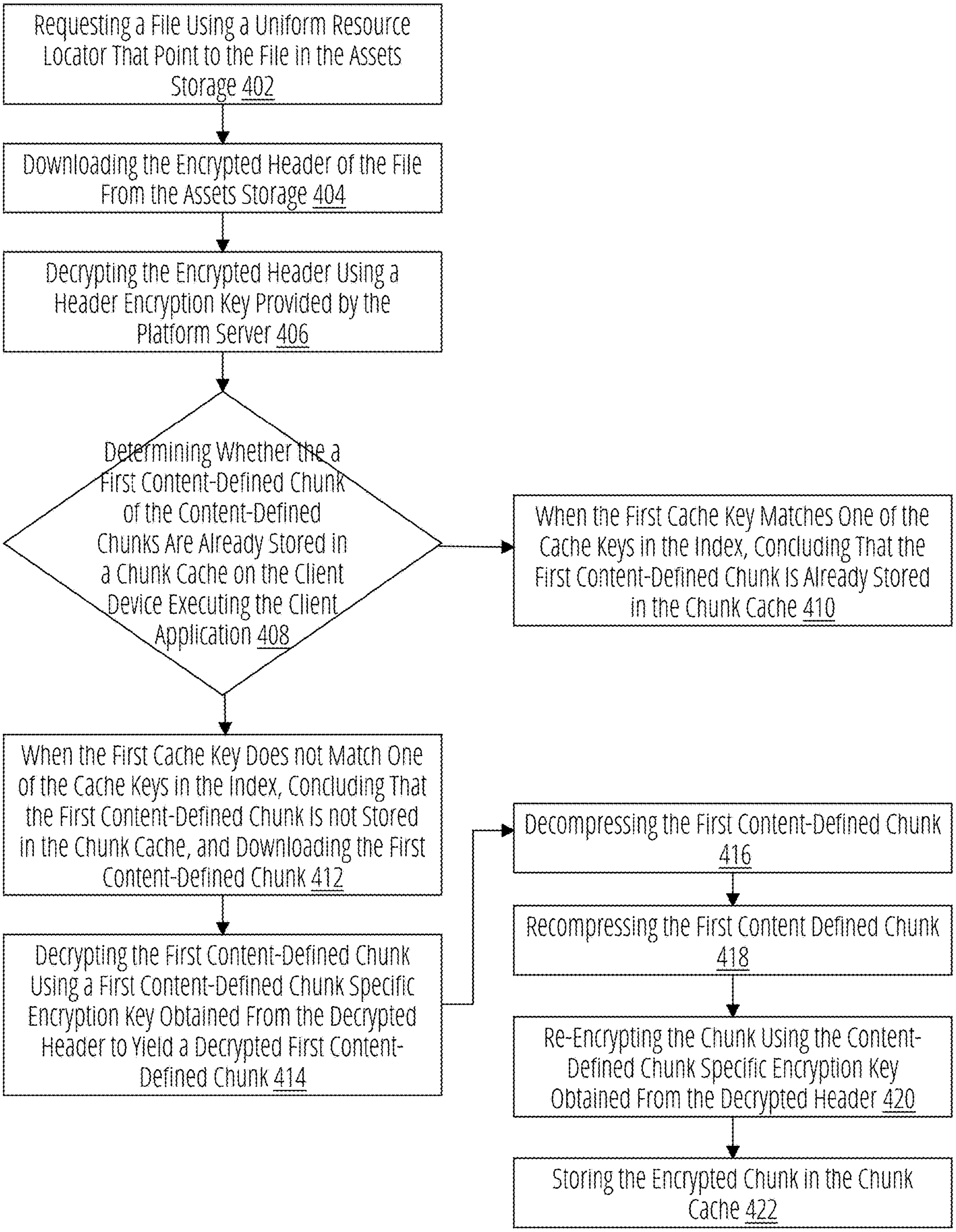
FIG. 4 illustrates an example routine from the perspective of client application-side downloading flow for the deduplication of at least some portions of a user-created game object in downloads by the client application in accordance with some aspects of the present technology.

FIG. 4 illustrates an example routine for the deduplication of at least some portions of a user-created game object in downloads to the client application in accordance with some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes requesting a file using a uniform resource locator that points to the file in the assets storage at step 402. For example, the client application 104 illustrated in FIG. 1 may requesting a file using a uniform resource locator that point to the file in the assets storage.

According to some examples, the method includes downloading the encrypted header of the file from the assets storage at step 404. For example, the client application 104 illustrated in FIG. 1 may downloading the encrypted header of the file from the assets storage. In some embodiments, the downloading of the header can be performed by using an HTTP range request to only request the header portion of the file.

According to some examples, the method includes decrypting the encrypted header using the asset-bundle-specific encryption key provided by the web services 110 through a request for the asset-bundle-specific encryption key via the Key API 216 at step 406. For example, the deduplication service 222 illustrated in FIG. 2 may decrypt the encrypted header using an asset-bundle-specific encryption key provided by web services 110. As addressed above, the decrypted header includes the cache keys, the encryption keys, and metadata for the respective chunks in the collection of encrypted content-defined chunks.

According to some examples, the method includes determining whether the first content-defined chunk of the content-defined chunks is already stored in a chunk cache on the client device executing the client application at decision 408. For example, the deduplication service 222 illustrated in FIG. 2 may determine whether a first content-defined chunk of the content-defined chunks is already stored in a chunk cache on the client device executing the client application. The determining consists of comparing a first cache key with an index of cache keys, including cache keys for the content-defined chunks stored in the chunk cache.

Note that the method does not care whether a chunk is part of the same asset bundle. A duplicate chunk can be part of any user-created game object. A duplicate chunk is merely duplicate data. The chunks can be arranged into different user-created game objects by being copied from the cache as often as needed.

While it might at first appear that the encryption keys for the content-defined chunks might be different when those content-defined chunks are part of different user-created game objects, this is not the case. Even though the decryption keys for the content-defined chunks are stored in the header for a particular asset bundle for a user-created game object, the nature of the convergent encryption is that all content-defined chunks that are the same will have the same encryption key regardless of the user-created game object in which they are a part.

According to some examples, when the first cache key matches one of the cache keys in the index, the deduplication service 222 concludes that the first content-defined chunk is already stored in the chunk cache at step 410.

According to some examples, when the first cache key does not match one of the cache keys in the index, the deduplication service 222 concludes that the first content-defined chunk is not stored in the chunk cache, and downloads the first content-defined chunk at step 412.

According to some examples, the method includes decrypting the first content-defined chunk using a first content-defined chunk specific encryption key obtained from the decrypted header to yield a decrypted first content-defined chunk at step 414. For example, the client application 104 illustrated in FIG. 1 may decrypt the first content-defined chunk using a first content-defined chunk specific encryption key obtained from the decrypted header to yield a decrypted first content-defined chunk.

According to some examples, the method includes decompressing the first content-defined chunk at step 416. For example, the client application 104 illustrated in FIG. 1 may decompress the first content-defined chunk.

According to some examples, the method includes recompressing the first content-defined chunk at step 418. For example, the client application 104 illustrated in FIG. 1 may recompress the first content-defined chunk. It is only necessary to decrypt (step 414) and decompress (step 416) the content-defined chunk if it is desirable to compress the content-defined chunk using a different compression algorithm. As noted above, the LZMA compression algorithm might be preferred for the content-defined chunks stored in the asset storage since those assets need to be efficiently transferred to the client application 104. Thus, for the content-defined chunks in asset storage, the size of the content-defined chunks is the most important attribute. However, when the content-defined chunks are stored in the chunk cache 218, the most important attribute is how quickly the content-defined chunks can be compressed and decompressed. For this reason, the recompression at step 420 can use the LZ4 compression algorithm.

According to some examples, the method includes re-encrypting the chunk using the content-defined chunk specific encryption key obtained from the decrypted header at step 420. For example, the client application 104 illustrated in FIG. 1 may re-encrypting the chunk using the content-defined chunk specific encryption key obtained from the decrypted header.

According to some examples, the method includes storing the encrypted chunk in the chunk cache at step 422. Using the techniques described herein, the present technology is able to deduplicate portions of user-created game objects that are stored in encrypted chunks. Importantly, the deduplication can occur without needing to decrypt or decompress the content-defined chunks stored in a cache.

While the present technology was described in the content of avoiding downloading and storing redundant chunks of user-created game objects to a client application for storage in the chunk cache, most of the principles described above are equally applicable to avoiding the duplicate storage of redundant chunks in the asset databases too.

Figure 5:
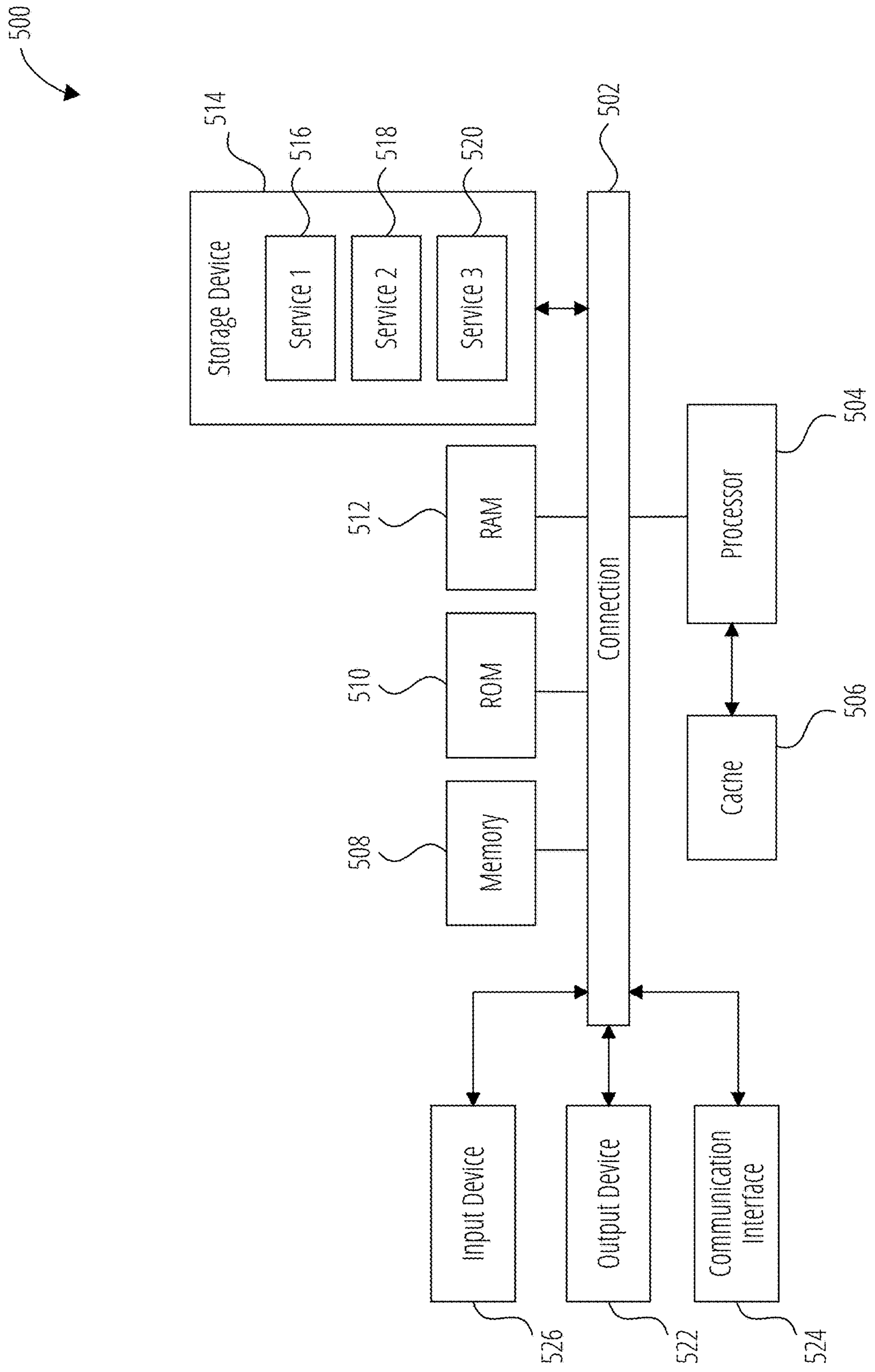
FIG. 5 shows an example of a system for implementing certain aspects of the present technology.

FIG. 5 shows an example of computing system 500, which can be for example any computing device making up client device 106, web services 110, game object editing environment 202, platform server 148, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspect 1. A method comprising: downloading an encrypted header of a file from an assets storage, the file including a user-created game object to be loaded by the client application; decrypting the encrypted header using a header encryption key retrieved through interaction with a service of a virtual world platform, the decrypted header including cache keys for encrypted and compressed content-defined chunks that make up the file; and determining that at least a first content-defined chunk of the encrypted and compressed content-defined chunks that make up the file are already stored in a chunk cache on the client device executing the client application, the chunk cache storing previously downloaded content-defined chunks that are also encrypted and compressed, the determining that the first content-defined chunk is already stored in the chunk cache is performed without decrypting or decompressing the previously downloaded content-defined chunks stored in the chunk cache.

Aspect 2. The method of Aspect 1, wherein the encrypted header includes encryption keys for the content-defined chunks making up the file in addition to the cache keys, the header encryption key is different than the encryption keys for the content-defined chunks.

Aspect 3. The method of any of Aspects 1 to 2, wherein the content-defined chunks were encrypted using a convergent encryption technique, whereby the chunks having the same data will have the same cache key and same encryption key.

Aspect 4. The method of any of Aspects 1 to 3, wherein the determining comprises comparing a first cache key for the first content-defined chunk with an index of cache keys including cache keys for the content-defined chunks stored in the chunk cache, whereby the first content-defined chunk that is already stored in the chunk cache can be part of a different file which always the first content-defined chunk to be used by different files, but the different files are only usable when the client application can decrypt the encrypted header using the header encryption key.

Aspect 5. The method of any of Aspects 1 to 4, wherein the first content-defined chunk stored at the assets storage was compressed by a first compression algorithm, and the content-defined chunks stored in the chunk cache were compressed by a second compression algorithm.

Aspect 6. The method of any of Aspects 1 to 5, further comprising: determining that at least a second content-defined chunk of the encrypted and compressed content-defined chunks that make up the file are not stored in the chunk cache when a second cache key does not match one of the cache keys in an index of cache keys including cache keys for the content-defined chunks stored in the chunk cache; and downloading the second content-defined chunk from an assets storage.

Aspect 7. The method of any of Aspects 1 to 6, further comprising: decrypting the second content-defined chunk using a second content-defined chunk specific encryption key obtained from the decrypted header to yield a decrypted second content-defined chunk; decompressing the second content-defined chunk that is compressed using a first compression algorithm and recompressing the second content-defined chunk using a second compression algorithm; re-encrypting the chunk using the content-defined chunk specific encryption key obtained from the decrypted header; and storing the encrypted chunk in the chunk cache.

Aspect 8. The method of any of Aspects 1 to 7, further comprising: receiving, by a deduplication service at a server of the virtual world platform, a first user-created game object from a game object editing environment, the user-created game object being packaged into a first asset bundle; splitting the user-created game object into the content-defined chunks using a content-defined chunking process; generating the encrypted header for the file for the user-created game object, the encrypted header including the cache keys and the encryption keys for the content-defined chunks making up the user-created game object; and storing the header encryption key used to encrypt the encrypted header at the service of the virtual world platform.

Aspect 9. The method of any of Aspects 1 to 8, further comprising: encrypting, by the deduplication service at the server of the virtual world platform, the content-defined chunks using a convergent encryption technique, whereby the chunks having the same data will have the same cache key and same encryption key.

Aspect 10. A method comprising: receiving, by a deduplication service at a platform server, a first user-created game object from a game object editing environment at a server, the user-created game object being packaged into a first asset bundle, the first asset bundle is having been compressed using for example, LZMA compression; decompressing, the first asset bundle for the first user-created game object to yield uncompressed assets in the asset bundle; split the user-created game object into content-defined chunks using a content-defined chunking process, wherein portions of the first user-created game object that contain the same data as second user-created game object are generally divided into resulting content-defined chunks that will include the same data; compressing the resulting content-defined chunks, the compressing can be performed by any compression algorithm, such as, for example, using the LZMA compression algorithm, the chunks are compressed using LZMA, LZ4 compression algorithm, or ZSTD (or no compression), LZMA has the smallest download size but is quite slow, LZ4 can be much larger than LZMA but is about as fast as uncompressed data, and ZSTD is kind of a compromise between the two—it's much faster than LZMA but is somewhat larger; encrypting the compressed content-defined chunks, where content-defined chunks having the same data will also end up having the same key, The compressed chunks are encrypted using Convergent Encryption (aka. Message-Locked Encryption), The goal of convergent encryption is to be able to encrypt a given clear text key from multiple independent nodes and guarantee that the encrypted output will match. To accomplish this, the content-defined chunks are encrypted, for example, with AES256-GCM encryption using the hash of its compressed data (plus a secret only the platform server will know) and uses a static nonce. This process guarantees that a given compressed content-defined chunk will produce an identical encrypted content-defined chunk every time it is encrypted regardless of what Asset Bundle it is currently part of.

Aspect 11. The method of Aspect 10, further comprising: requesting, by a client application, a file using a uniform resource locator that point to the file in the assets storage; downloading the encrypted header of the file from the assets storage; decrypting the encrypted header using a header encryption key provided by the platform server, the decrypted header including the cache keys for the content-defined chunks; determining whether the a first content-defined chunk of the content-defined chunks are already stored in a chunk cache on the client device executing the client application, the determining consisting of comparing a first cache key with an index of cache keys including cache keys for the content-defined chunks stored in the chunk cache; when the first cache key does not match one of the cache keys in the index, concluding that the first content-defined chunk is not stored in the chunk cache, and downloading the first content-defined chunk; decrypting the first content-defined chunk using a first content-defined chunk specific encryption key obtained from the decrypted header to yield a decrypted first content-defined chunk; decompressing the first content-defined chunk and recompressing the first content-defined chunk using an LZ4 compression algorithm, the LZ4 compression algorithm is preferred for assets already stored on the client device in the chunk cache because, while the file can be much larger than LZMA it is about as fast as uncompressed data, and speed on compression and decompression is the key performance parameter for data already stored on the client device; re-encrypting the chunk using the content-defined chunk specific encryption key obtained from the decrypted header; and storing the encrypted chunk in the chunk cache; when the first cache key matches one of the cache keys in the index, concluding that the first content-defined chunk is already stored in the chunk cache.

What is claimed is:

1. A method comprising:

downloading an encrypted header of a file from an assets storage, the file including a user-created game object to be loaded by a client application;

decrypting the encrypted header using a header encryption key retrieved through interaction with a service of a virtual world platform, the decrypted header including cache keys for encrypted and compressed content-defined chunks that make up the file; and determining that at least a first content-defined chunk of the encrypted and compressed content-defined chunks that make up the file are already stored in a chunk cache on a client device executing the client application, the chunk cache storing previously downloaded content-defined chunks that are also encrypted and compressed, the determining that the first content-defined chunk is already stored in the chunk cache is performed without decrypting or decompressing the previously downloaded content-defined chunks stored in the chunk cache, wherein the determining comprises comparing a first cache key for the first content-defined chunk with an index of cache keys including the cache keys for the content-defined chunks stored in the chunk cache.

2. The method of claim 1, wherein the encrypted header includes encryption keys for content-defined chunks making up the file in addition to the cache keys, the header encryption key is different than the encryption keys for the content-defined chunks.

3. The method of claim 2, wherein the content-defined chunks were encrypted using a convergent encryption technique, whereby the content-defined chunks having the same data will have the same cache key and same encryption key.

4. The method of claim 1, wherein the first content-defined chunk stored at the assets storage was compressed by a first compression algorithm, and the content-defined chunks stored in the chunk cache were compressed by a second compression algorithm.

5. The method of claim 1, further comprising:

determining that at least a second content-defined chunk of the encrypted and compressed content-defined chunks that make up the file are not stored in the chunk cache when a second cache key does not match one of the cache keys in an index of cache keys including the cache keys for the content-defined chunks stored in the chunk cache; and downloading the second content-defined chunk from the assets storage.

6. The method of claim 5, further comprising:

decrypting the second content-defined chunk using a second content-defined chunk specific encryption key obtained from the decrypted header to yield a decrypted second content-defined chunk;

decompressing the second content-defined chunk that is compressed using a first compression algorithm and recompressing the second content-defined chunk using a second compression algorithm;

re-encrypting the chunk using the content-defined chunk specific encryption key obtained from the decrypted header; and storing the encrypted content-defined chunk in the chunk cache.

7. The method of claim 1, further comprising:

receiving, by a deduplication service at a server of the virtual world platform, a first user-created game object from a game object editing environment, the user-created game object being packaged into a first asset bundle;

splitting the user-created game object into the content-defined chunks using a content-defined chunking process;

generating the encrypted header for the file for the user-created game object, the encrypted header including the cache keys and the encryption keys for the content-defined chunks making up the user-created game object; and storing the header encryption key used to encrypt the encrypted header at the service of the virtual world platform.

8. The method of claim 7, further comprising:

encrypting, by the deduplication service at the server of the virtual world platform, the content-defined chunks using a convergent encryption technique, whereby the chunks having the same data will have the same cache key and same encryption key.

9. A system comprising:

a storage configured to store instructions;

at least one processor configured to execute the instructions and cause the at least one processor to:

download an encrypted header of a file from an assets storage, the file including a user-created game object to be loaded by a client application;

decrypt the encrypted header using a header encryption key retrieved through interaction with a service of a virtual world platform, the decrypted header including cache keys for encrypted and compressed content-defined chunks that make up the file; and determine that at least a first content-defined chunk of the encrypted and compressed content-defined chunks that make up the file are already stored in a chunk cache on a client device executing the client application, wherein determining comprises comparing a first cache key for the first content-defined chunk with an index of cache keys including the cache keys for the content-defined chunks stored in the chunk cache.

10. The system of claim 9, wherein the encrypted header includes encryption keys for content-defined chunks making up the file in addition to the cache keys, the header encryption key is different than the encryption keys for the content-defined chunks.

11. The system of claim 10, wherein the content-defined chunks were encrypted using a convergent encryption technique, whereby the content-defined chunks having the same data will have the same cache key and same encryption key.

12. The system of claim 9, wherein the first content-defined chunk is already stored in the chunk cache and can be part of a different file that is always the first content-defined chunk to be used by different files.

13. The system of claim 9, wherein the first content-defined chunk stored at the assets storage was compressed by a first compression algorithm, and the content-defined chunks stored in the chunk cache were compressed by a second compression algorithm.

14. The system of claim 9, wherein the at least one processor is configured to execute the instructions and cause the at least one processor to:

determine that at least a second content-defined chunk of the encrypted and compressed content-defined chunks that make up the file are not stored in the chunk cache when a second cache key does not match one of the cache keys in an index of cache keys including cache keys for the content-defined chunks stored in the chunk cache; and download the second content-defined chunk from the assets storage.

15. The system of claim 14, wherein the at least one processor is configured to execute the instructions and cause the at least one processor to:

decrypt the second content-defined chunk using a second content-defined chunk specific encryption key obtained from the decrypted header to yield a decrypted second content-defined chunk;

decompress the second content-defined chunk that is compressed using a first compression algorithm and recompressing the second content-defined chunk using a second compression algorithm;

re-encrypt the content-defined chunk using the content-defined chunk specific encryption key obtained from the decrypted header; and store the encrypted chunk in the chunk cache.

16. A non-transitory computer readable medium comprising instructions, the instructions, when executed by a computing system, cause the computing system to:

download an encrypted header of a file from an assets storage, the file including a user-created game object to be loaded by a client application;

decrypt the encrypted header using a header encryption key retrieved through interaction with a service of a virtual world platform, the decrypted header including cache keys for encrypted and compressed content-defined chunks that make up the file; and determine that at least a first content-defined chunk of the encrypted and compressed content-defined chunks that make up the file are already stored in a chunk cache on a client device executing the client application, wherein determining comprises comparing a first cache key for the first content-defined chunk with an index of cache keys including the cache keys for the content-defined chunks stored in the chunk cache.

17. The non-transitory computer readable medium of claim 16, wherein the encrypted header includes encryption keys for content-defined chunks making up the file in addition to the cache keys, the header encryption key is different than the encryption keys for the content-defined chunks.

18. The non-transitory computer readable medium of claim 16, wherein the computer readable medium further comprises instructions that, when executed by the computing system, cause the computing system to:

determine that at least a second content-defined chunk of the encrypted and compressed content-defined chunks that make up the file are not stored in the chunk cache when a second cache key does not match one of the cache keys in an index of cache keys including cache keys for the content-defined chunks stored in the chunk cache; and download the second content-defined chunk from the assets storage.

19. The non-transitory computer readable medium of claim 16, wherein the computer readable medium further comprises instructions that, when executed by the computing system, cause the computing system to:

receive, by a deduplication service at a server of the virtual world platform, a first user-created game object from a game object editing environment, the user-created game object being packaged into a first asset bundle;

split the user-created game object into the content-defined chunks using a content-defined chunking process;

generate the encrypted header for the file for the user-created game object, the encrypted header including the cache keys and the encryption keys for the content-defined chunks making up the user-created game object; and store the header encryption key used to encrypt the encrypted header at the service of the virtual world platform.

20. The non-transitory computer readable medium of claim 19, wherein the computer readable medium further comprises instructions that, when executed by the computing system, cause the computing system to:

encrypt, by the deduplication service at the server of the virtual world platform, the content-defined chunks using a convergent encryption technique, whereby the chunks having the same data will have the same cache key and same encryption key.

* * * * *